Patented Oct. 28, 1941

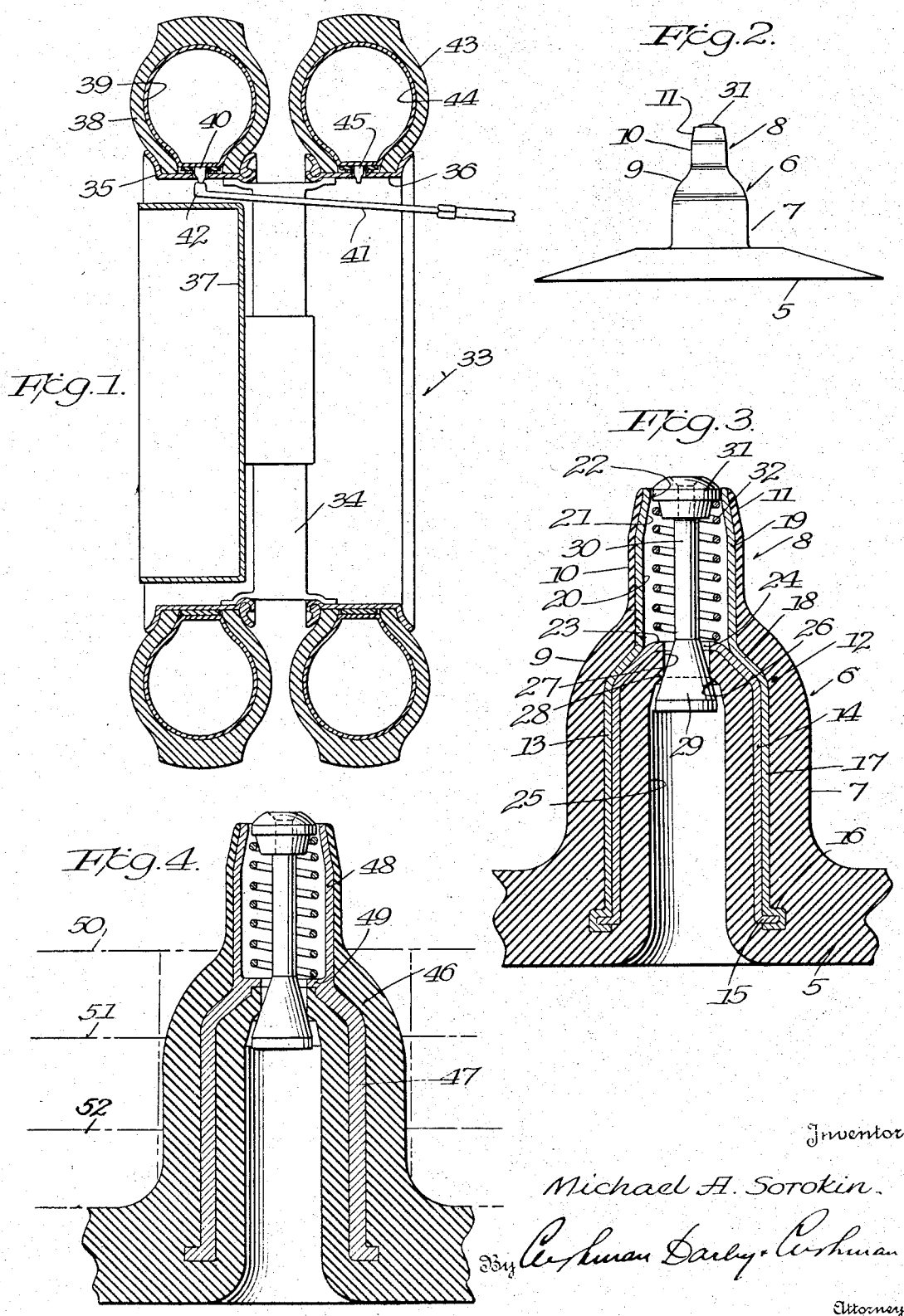

2,260,646

UNITED STATES PATENT OFFICE 2,260,646

VALVE STEM

Michael A. Sorokin, Milford, Conn., assignor to Jenkins Bros., Bridgeport, Conn., a corporation of New Jersey Application February 8, 1939, Serial No. 255,322

2 Claims. (Cl. 152—430)

This invention relates to valve stems and particularly to rubber valve stems. More particularly the invention relates to rubber valve stems designed for use in connection with the tires of heavy trucks and buses and the like. A particular advantage of the new valve stem is realized when it is applied to the inner one of the tires of a double-tired wheel.

In the case of the double-tired wheel the rim which carries the inner one of the two tires ordinarily surrounds a brake drum with very little clearance between the two. In order that this tire may be serviced, it has been the custom heretofore to provide it with an elongated, bent, metal stem passing between the rim and the drum and out between the spokes so as to be accessible for the application of an inflating chuck or a cap. In use, this metal stem absorbs heat from the frequently very highly heated drum and carries this heat to the valve provisions so that the rubber portions of the latter rapidly deteriorate and must be replaced. Furthermore, in the case of puncture, the tube frequently is torn from the metal stem which cannot follow the tube if there is relative rotation between it and the wheel rim.

With the valve provisions heretofore in common use, it has been considered necessary to provide a secondary seal in the form of a cap threadable on the end of the metal stem, and the long, bent metal stem has been necessary in order to render the end of the stem accessible so that a cap may be threaded thereon, as above mentioned. Even with a very short, straight, metal stem, the clearance between the drum and surrounding rim is ordinarily such that it would be impossible to thread a cap on the stem or remove it.

It is a principal object of the present invention to provide a straight, short stem accessible to an inflating chuck, and of such construction that the cap becomes unnecessary. Another object of the invention is to provide a stem so proportioned as to be enabled to withdraw readily through the rim opening so as to avoid damage to the tube when a puncture occurs in use. These purposes are achieved in the use of a stem such as is shown by way of example in the accompanying drawing, to which reference will now be made in explaining the invention.

In the drawing:

Figure 1 is an axial section of a double wheel equipped with stems according to the invention;

Figure 2 is an elevation of a stem such as is shown in Figure 1;

Figure 3 is an axial section of the central portion of the stem of Figure 2, considerably enlarged, and Figure 4 is a section like that of Figure 3 but showing a modified form of internal construction.

Referring first to Figures 2 and 3 of the drawing, the illustrated stem comprises a base flap 5 and a shaft or body portion generally indicated at 6 which rises from the flap and is ordinarily molded integrally therewith. If the shaft is formed integrally with the tube, the flap, as such, is omitted. As here shown, the flap is contemplated as being of circular form with its margins beveled to a feather edge, and the shaft 6 rises from the center of the flap.

The shaft 6 comprises a substantially cylindrical or somewhat upwardly tapered portion 7 immediately adjacent the flap, the portion 7 being merged into a reduced tip portion 8 of circular section through a rounded shoulder 9. The tip portion 8 comprises a substantially cylindrical portion 10, immediately adjacent the shoulder 9, and a slightly conical or tapered extremity 11.

Molded in the stem is an insert generally indicated at 12, Figure 3. As shown in the figure, the insert is made up of a pair of telescoped light metal shells 13 and 14, the lower edge of the latter being outwardly flanged at 15, and the lower edge of the former being outwardly flanged at 16 and bent or spun around the flange 15 so as to embrace the latter and securely hold the shells together. The shell 13 has a lower cylindrical portion 17 which through a shoulder 18 is joined with a reduced upper portion 19 which conforms internally substantially to the outward shape of the tip 8 so that a chamber is provided which has lower substantially cylindrical walls 20 and tapering upper walls 21, which latter define a slightly constricted circular end opening 22. The shell 14 is shaped to fit snugly within the lower portion of shell 13 and against the shoulder of the latter, having also an inwardly extending flange 23 which defines a circular opening 24 on the axis of the stem.

In the molding operation the insert 12 is embedded in the rubber composition so as to be completely surrounded by the latter except, ordinarily, for the top edge of the insert at the opening. Furthermore, the insert is completely lined internally with the rubber composition up to the flange 23, the metal of the tip portion 19 being left internally exposed. The rubber lining defines an axial passage comprising a lower cylindrical portion 25 which through a conical portion 26 is merged into a reduced cylindrical portion 27 of the same diameter as, and coaxial with, the opening 24. When the conical portion 26 meets the cylindrical portion 27, there is formed a sharp edge 28 designed to serve as a valve seat.

Cooperating with the seat 28 is a conical valve body 29 whose angle to its axis is considerably sharper than the angle of the conical passage portion 26 so that an initial line contact, which widens under the spring and air pressure in use, is afforded between the valve body and the seat. A pin 30 secured to valve body 29 extends upwardly into the tip portion and has secured to its upper end a circular head 31 which substantially fills the end opening 22 when body 29 is seated and may normally project slightly outwardly as shown. A compression spring 32 is interposed between head 31 and flange 23 and normally holds body 29 yieldingly seated. The head is freely axially movable at all times in opening 22 so that it can never interfere with the full seating of body 29. Normally the head serves as a closure to keep foreign matter from the tip chamber. During inflation it moves inwardly of the chamber to permit the passage of air to the tube, the movement being caused either by a trip pin in the chuck or by air pressure. It will be seen from Figure 3 that the lower outwardly flanged end of the insert is completely embedded in the flap 5 and serves as an effective anchoring provision. In the preferred relation shown, the flanged lower end is completely within the projection of cylindrical portion 7 so that the flexibility of the flap is not substantially impaired and it may conform freely to a tube to which it is subsequently vulcanized.

Figure 2 shows the new stem in substantially the actual size which has been successfully used, and the proportion of parts shown in this figure are preferred, although they may be varied without necessarily departing from the invention. As shown, the tip portion 8 is of suitable diameter, for example about nine-thirty-seconds of an inch, and of suitable length, for example about three-eighths of an inch, to be received in an inflating chuck. The length of the tip portion is preferably not substantially greater than that necessary for operative engagement in the chuck. The remainder of the shaft 6, including cylindrical portion 7 and shoulder 9, is about twice the length of the tip portion and is of about twice the diameter of the latter. The cylindrical portion 7 preferably does not greatly exceed in length the thickness of a wheel rim at the rim opening. With a stem of the size shown in Figure 2 and with a metal rim one quarter of an inch thick, the major length of the cylindrical portion 7 would be in the rim opening.

In Figure 1 a wheel generally indicated at 33 has the spokes 34, the two rims 35 and 36 and the brake drum 37, there being a restricted annular space between the drum 37 and rim 35. Rim 35 carries a casing 38 and an inner tube 39 which latter is provided with a valve stem 40, such as heretofore described, the valve stem projecting through a rim opening slightly into the space between the rim and drum. This projection may be no more than sufficient to afford operative engagement by an inflating chuck, such as indicated at 41, the chuck being introduced between the wheel spokes and into the annular space and having a head 42 provided with a side opening, as shown. Rim 36 carries a casing 43, inner tube 44, and valve stem 45 exactly as rim 35.

As shown in Figure 1, the projection of the valve stems depends only on the thickness of the rims, which are of metal and may be of a thickness up to one-quarter of an inch or more. In such practice, the lower portion of the shaft may be made even shorter than shown. However, it is not unusual practice to provide a flap or liner between the inner tube and the rim, and this flap often has a thickness up to one-quarter of an inch or more which must be traversed by the valve stem in addition to the rim. With such a flap, the projection of the stem would be substantially reduced as compared to that shown in Figure 1. Where the annular space is extremely restricted, a further spacing member in the form of a disc of desired thickness provided with an opening for the stem may be used. In other words, the rim structure as a whole may include several layers which will be traversed by the valve stem, as will be hereinafter further discussed. The proportions shown in Figure 2 are such that the stem is adaptable to the various usages.

Furthermore, due to the relatively large diameter of the shaft portion 7 as compared to the tip portion 10, and due to the fact that the portion 7 projects little, if any, beyond the rim, ready withdrawability is achieved so that in case of relative movement between the tube and rim, the stem can follow the tube without being torn from the latter.

The insert 12 of Figure 3 is of preferred construction, being relatively thick-walled below the valve seat so as to effectively prevent ballooning under high pressures. Furthermore, the insert is conveniently made from parts of uniform wall thickness. In Figure 4 the insert 46 is of integral construction and includes a relatively thick-walled lower portion 47 and a relatively thin-walled tip portion 48 separated by an integral flange 49 which, as before, backs the seat in conjunction with the insert shoulder and serves as a spring seat. In Figure 4 I have indicated, in dotted lines and in part, a wheel rim at 50, a flap or liner at 51, and a washer-like spacing member at 52. Only the tip portion of the stem projects through the rim opening. With the spacing member omitted the combined thickness of the rim and flap would be about the same as the length of the cylindrical base portion of the flap, so that the shoulder, as well as the tip portion, would project. The relatively light metal parts do not conduct heat unduly so that the valve seat is enabled to stand up during a long period of use. The rubber of the stem is yieldable throughout and may be of the same composition as that employed in rubber valve stems heretofore in use.

In using such terms as "upper" and "lower" herein, reference is had to the stems in the position shown in Figures 2 to 4 and the terms are used merely as a matter of convenient description.

It will be noted that the flap 5 of Figure 2 is shaped for application to the outside of the tube. With a flap for application to the inside of a tube it would be necessary to lengthen the cylindrical portion 7 by the thickness of the tube in order to retain the preferred proportions which have been discussed.

It will be understood that variations in detail are possible from the disclosure herein without departure from the invention, and accordingly, I do not limit myself to matters of form and arrangement except as in the following claims. In these claims the term "rubber" is intended to include any rubber-like composition, natural or artificial.

I claim:

1. A valve stem comprising a rubber flap and a rubber shaft integral with said flap, a tubular insert coaxially incorporated in and extending through said shaft and into said flap, said shaft extending from the flap and terminating in a tapering annular shoulder; said insert having a tip portion projecting beyond said shoulder, a base portion within the base portion of the shaft and of enlarged cross-section as compared to the tip portion, and an annular shoulder adjacent and within the shaft shoulder joining the tip and base portions of the insert, the insert being flanged within the flap and the base and shoulder portions of the insert being constituted by telescoped portions; there being a passage extending throughout said insert and through said flap.

2. A valve stem including a tubular insert having upper and lower portions, said upper portion being of smaller cross section than said lower portion and said portions being joined by a tapered shoulder, said insert also including an inwardly directed shoulder in adjacency to the upper extremity of said tapered shoulder and adapted to provide an abutment for a spring, a rubber body portion in which said lower portion of said insert and said tapered shoulder are embedded whereby said rubber body portion includes inner and outer sections of which the outer has a tapered shoulder embracing the tapered shoulder of the insert, said inner section extending within said insert throughout the length of the lower portion of said insert and crossing the tapered shoulder of the insert but terminating at said inwardly directed shoulder to constitute a rubber valve seat that is backed by the insert shoulders, and a rubber flap with which said sections are integrally joined, said insert terminating at its lower end within said flap, the length of the stem portion beyond the shoulder of said outer section being on the order of one third of that of the stem from its tip to said flap and the length of said outer section between its shoulder and said flap being on the order of the thickness of a wheel rim structure.

MICHAEL A. SOROKIN.